(12) United States Patent
Oshita

(10) Patent No.: US 6,494,786 B2
(45) Date of Patent: *Dec. 17, 2002

(54) LCD GAME APPARATUS

(75) Inventor: Satoshi Oshita, Tokyo (JP)

(73) Assignee: Kabushiki Kabushiki Bandai, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 57 days.

(21) Appl. No.: 09/301,796

(22) Filed: Apr. 29, 1999

(65) Prior Publication Data

US 2002/0047237 A1 Apr. 25, 2002

(30) Foreign Application Priority Data

Aug. 4, 1998 (JP) .......................................... 10-220565

(51) Int. Cl.⁷ ............................................... A63F 13/08
(52) U.S. Cl. ........................ 463/46; 463/47; 273/148 B
(58) Field of Search ........................ 273/148 B; 463/36, 463/37, 46, 47; D21/324, 329, 331, 332, 333; 320/112, 113, 114; 396/539, 540; D13/103; 429/100

(56) References Cited

U.S. PATENT DOCUMENTS

| | | | |
|---|---|---|---|
| 4,969,647 A | * 11/1990 | Mical et al. | ............... 463/46 X |
| D320,624 S | * 10/1991 | Taylor | ........................ D21/331 |
| 5,184,830 A | * 2/1993 | Okada et al. | .............. 463/37 X |
| 5,608,303 A | * 3/1997 | Leiserson | ........................ 320/2 |
| D414,217 S | * 9/1999 | Iinuma et al. | ............. D21/329 |
| 5,951,339 A | * 9/1999 | Burrell et al. | ................. 463/46 |
| D416,291 S | * 11/1999 | Sugino | ........................ D21/329 |
| D420,398 S | * 2/2000 | Fai | ............................. D21/329 |

FOREIGN PATENT DOCUMENTS

| | | |
|---|---|---|
| JP | 61-83260 | 6/1986 |
| JP | 07-88251 | 4/1995 |
| JP | 09-253332 | 9/1997 |

* cited by examiner

Primary Examiner—Raleigh W. Chiu
(74) Attorney, Agent, or Firm—Luce, Forward, Hamilton & Scripps LLP

(57) ABSTRACT

An LCD game apparatus is provided in which is formed on the rear surface of its body a protrusion to be hooked by fingers to make the position of holding the apparatus by hands stable and the possibility of incorrectly pressing operating buttons may be eliminated. The apparatus has such an arrangement as to be extremely rarely dropped even if a player is so absorbed in the game playing as to unintentionally handle the apparatus body forcefully and swing it, or when the player's hands get slippery with perspiration. The LCD game apparatus 1 is provided with a liquid crystal display portion 4 and operating buttons 60, 61 and 62 on the front surface 2a of the apparatus body 2, in which is formed on the rear surface 2b of the apparatus body 2 a protrusion extending substantially parallel with one side edge. The protrusion 25 forms a battery compartment and is provided on a battery case 21 to be installed attachably and detachably to the apparatus body 2.

10 Claims, 5 Drawing Sheets

LCD GAME APPARATUS

BACKGROUND OF THE INVENTION

1. Field of the Invention

The present invention relates to an LCD game apparatus which can be easily held.

2. Description of the Related Art

There is known a conventional LCD game apparatus which is formed in a thin shape with flat front and rear surfaces of its body and is provided with a liquid crystal display portion and operating buttons on the front surface, in which a flat rear cover of a battery compartment is screwed on to be fixed to the rear surface.

The conventional LCD game apparatus is designed to permit the user to play games displayed on the liquid crystal display by gripping the sides of the apparatus body with the palms of the hands, holding the rear surface of the body with the four fingers of each hand and pressing the operating buttons with the thumbs of each hand. Since the conventional LCD game apparatus is formed in a flat thin shape, the required hand-holding position is not always stable and the operating buttons may be sometimes pressed incorrectly. In addition, as the speed of games progressively increase, a player may drop the game as the player becomes absorbed in the game playing as to unintentionally handle the apparatus body forcefully and swing it, or when the player's hands get slippery with perspiration. Since the LCD game apparatus is equipped with a precise LSI, it may sometimes be broken just by being dropped.

SUMMARY OF THE INVENTION

The present invention has been made in view of the above drawbacks. It is therefore an object of this invention to provide an LCD game apparatus in which a protrusion is formed on the rear surface of the body which may be hooked by the fingers to make the position of holding the apparatus stable so that the possibility of incorrectly pressing the operating buttons may be eliminated. The implementation of such an arrangement provides the advantage of greatly decreasing the likelihood the game will be dropped, even if a player is so absorbed in the game playing as to unintentionally handle the apparatus body forcefully and swing it, or when the player's hands get slippery with perspiration.

In order to attain the above objects and other objects and advantages, an LCD game apparatus according to a first aspect of the present invention has the following features:

(1) A liquid crystal display portion and operating buttons are provided on the front surface of the apparatus body; and (2) A protrusion extending substantially parallel with one side edge of the apparatus body is formed on its rear surface.

Furthermore, the protrusion may form a battery compartment. The protrusion may also be formed on a battery case which is attachably and detachably installed to the apparatus body.

DETAILED DESCRIPTION OF THE INVENTION

Figure 1:
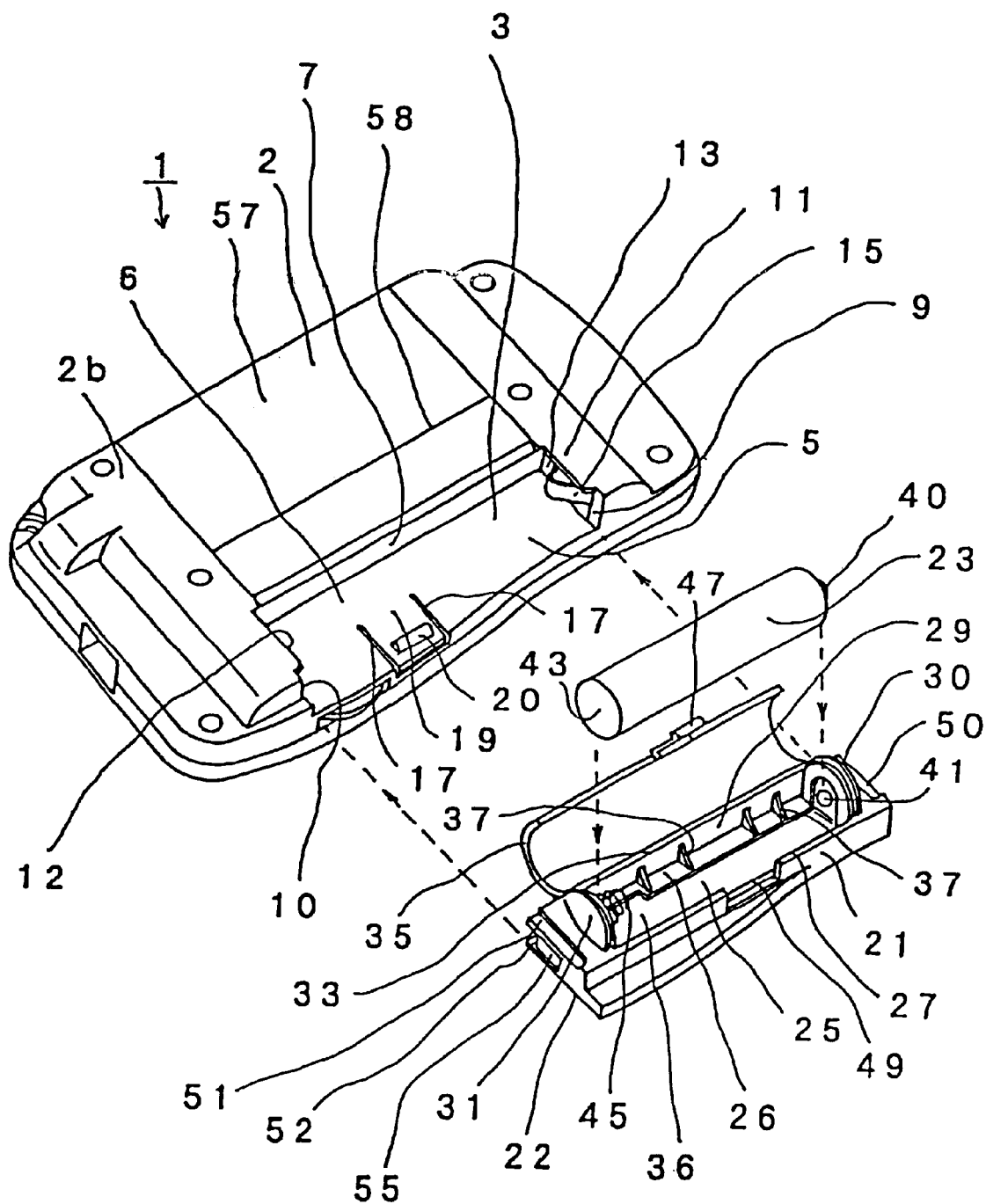
FIG. 1 is an exploded perspective view of an LCD game apparatus in accordance with an embodiment of the present invention viewed from its rear surface side.

An LCD game apparatus in accordance with an embodiment of the present invention is now described with reference to FIGS. 1 to 5.

The LCD game apparatus 1 is provided with a liquid crystal display portion 4 and operating buttons 60, 61, and 62 on the front surface 2a of the apparatus body 2. On the rear surface 2b of the LCD game apparatus 1 a protrusion 25 extends substantially parallel with one side edge 2c of the apparatus body 2. The protrusion 25 may form a battery compartment. The protrusion 25 may also be formed on a battery case 21 which is attachably and detachably installed to the apparatus body 2.

Figure 4:
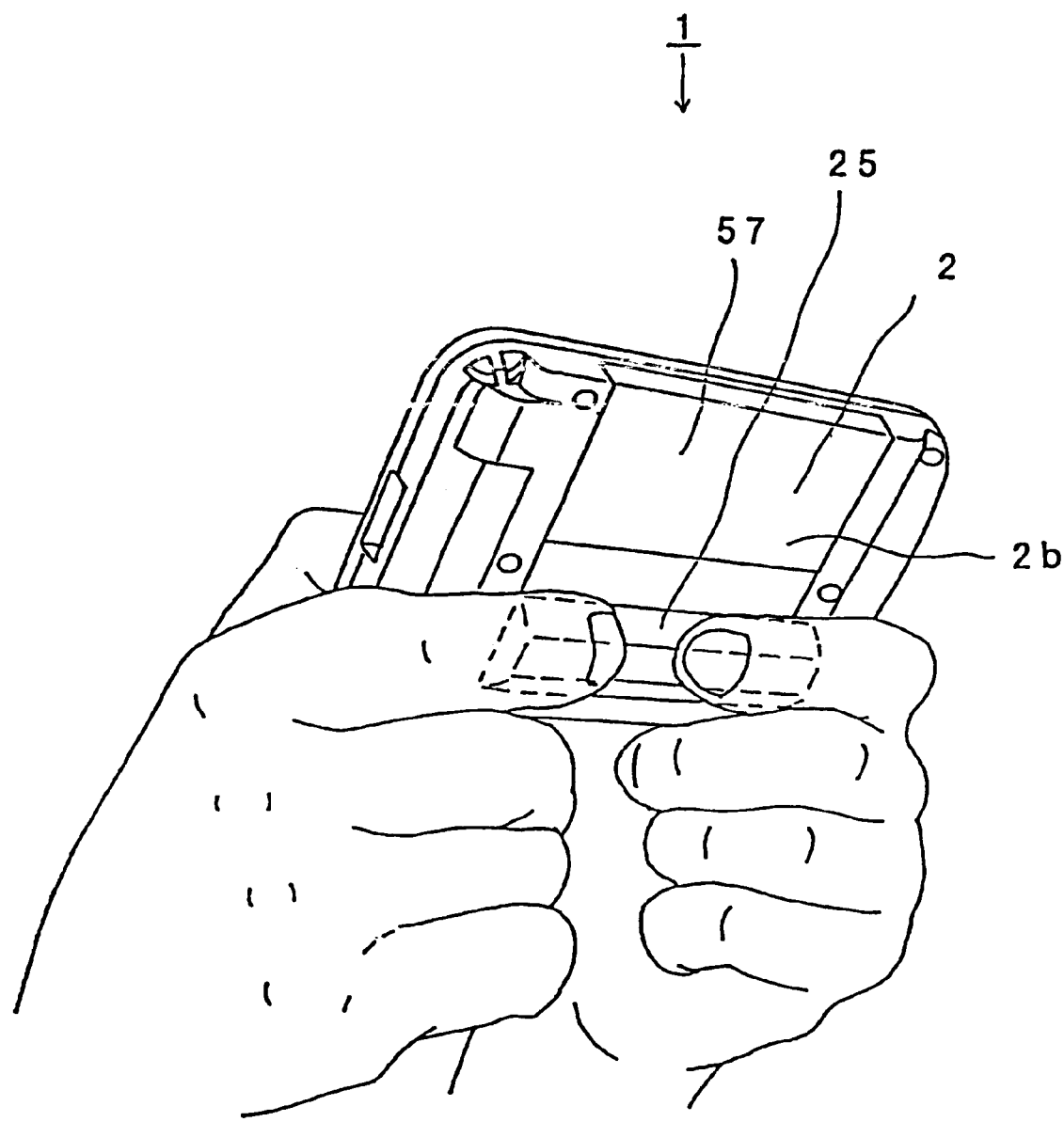
FIG. 4 is a rear perspective view showing a status where the LCD game apparatus in accordance with an embodiment of the present invention is being operated.
Figure 5:
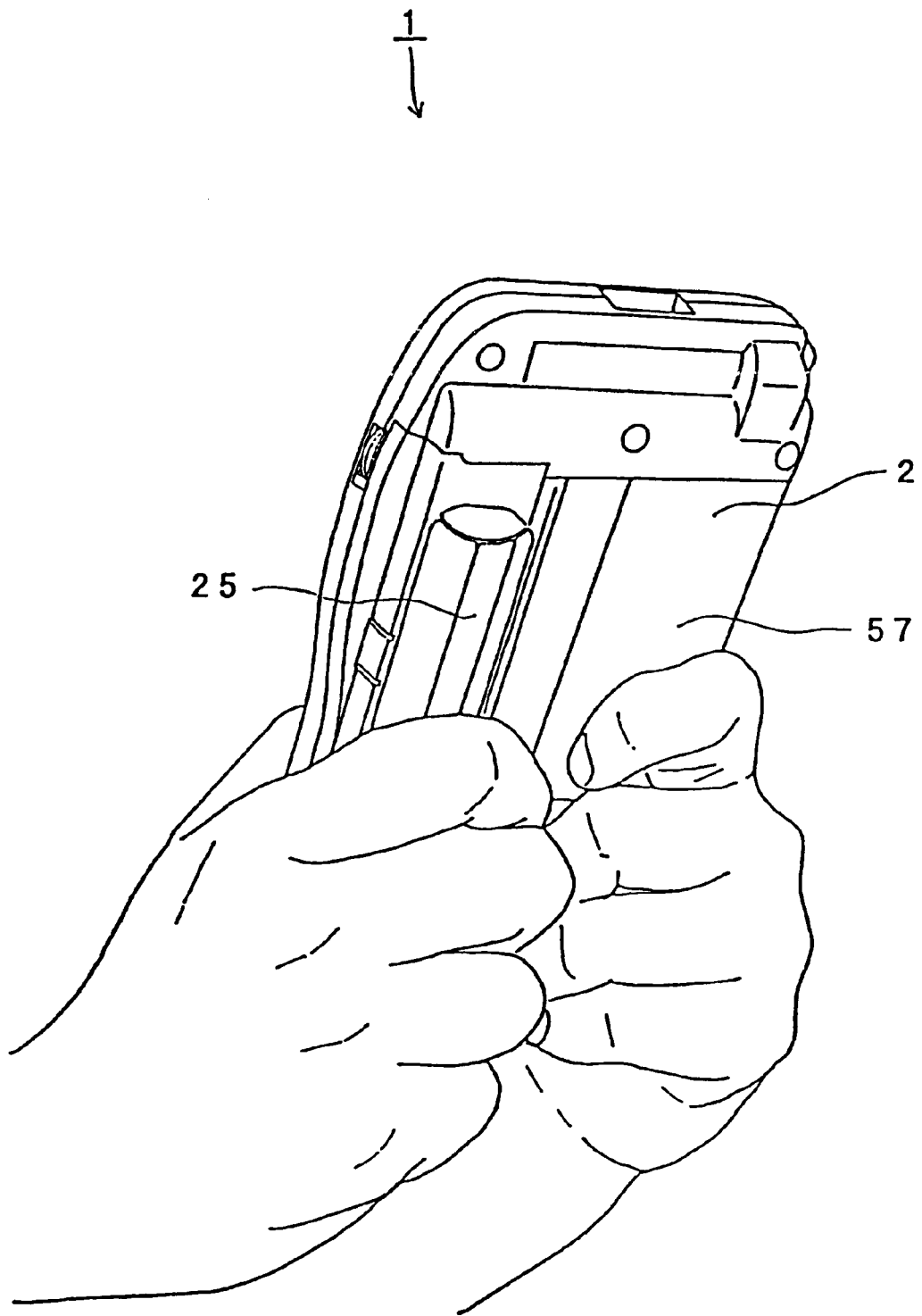
FIG. 5 is a rear perspective view showing a status where the LCD game apparatus in accordance with an embodiment of the present invention is being operated.

As best shown in FIGS. 4 and 5, a player enjoys playing games displayed on the liquid crystal display portion 4 by gripping the both sides of the apparatus body 2 with the palms of the hands, holding the rear surface 2b of the apparatus body 2 with all fingers, except the thumbs, and pressing the operating buttons 60, 61 and 62 with thumbs. Since the protrusion 25 provided on the rear surface 2b of the apparatus body 2 may be hooked by the index fingers and other fingers, the holding position of the LCD game apparatus by the player's hands is stable and the possibility of incorrectly pressing the operating buttons 60, 61 and 62 may be eliminated, even if a player is so absorbed in the game playing as to unintentionally handle the apparatus body 2 forcefully and swing it or when the player's hands get slippery with perspiration, it cannot be dropped.

When the protrusion 25 is a battery compartment, which can house a dry battery available for relatively lower price, such as an R 6 type, or AA- or AAA-type battery, the LCD game apparatus 1 can be prepared inexpensively compared with a conventional LCD game apparatus using a button battery.

When the protrusion 25 is formed on the battery case 21 which can be attachably and detachably installed in the apparatus body 2, if various battery cases 21 for different kinds of batteries, the battery cases 21 can be exchanged depending upon the duration of playing games.

Addressing an embodiment of the present invention in further detail, as shown in FIG. 1, a housing recess 3 having an insertion opening 5 is formed in the lower part of the rear surface 26 of the apparatus body 2. The housing recess 3 is formed of a flat bottom wall 6, a rear wall 7, a right side wall 9 and a left side wall 10. An engaging edge 11 is formed in the upper part of the right side wall 9 and an engaging edge 12 is formed in the upper part of the left side wall 10.

An opening 13 is formed in the right side wall 9, from which a contacting piece 15 having conductivity is projected. Similarly, an opening is also formed in the left side wall 10, from which a contacting piece having conductivity (not shown) is projected. The contacting piece 15 projecting from the right side wall 9 and the contacting piece projecting from the left side wall 10 are electrically connected to the LSI inside the apparatus body 2. An elastic piece 19 is formed in the front part of the bottom wall 6 by a pair of cutaway grooves 17, 17 and an engaging projection 20 is placed on the upper face of the elastic piece 19.

The battery case 21 makes up a part of the apparatus body 2 and the bottom surface 22 is formed flat. A battery compartment 25 in half pipe shape is formed in the center for housing a cylindrical battery 23 such as R6 type, R 3 type, AA-type or AAA-type battery. The battery compartment 25 is constituted of a bottom wall 26, a front wall 27, a rear wall 29, a right side wall 30 in semicircle shape, a left side wall 31 in semicircle shape and a cover member 35 in half cylindrical shape jointed open-closably to the upper edge of the rear wall 29 by a thin hinge 33.

In the bottom wall 26, an opening 36 in substantially rectangular shape, which extends through the lower part of the battery 23, is formed and placing pieces 37 and 37' for placing the circumference surface of the battery 23 are mounted at the front and rear ends thereof. A conductive piece 41 for contacting a plus terminal 40 of the battery 23 is installed in the inner surface of the right side wall 30. A conductive spring 45 for contacting a minus terminal 43 of the battery 23 is installed in the inner surface of the left side wall 31. An engaging recess 49 for engaging an engaging claw 47 protrusively placed in the center of the front edge of the cover member 35 is formed in the center upper edge of the front wall 27.

Stepped engaging portions 50, 51 for engaging with the engaging edges 11, 12, respectively, are formed in the both sides in the battery case 21. A recess 52 is formed in the lower part of the stepped engaging portion 51 and a different recess (not shown) is also formed in the lower part of the stepped engaging portion 50. A conductive member 55 to be connected to the conductive spring 45 is provided in the recess 52 in the side of the stepped engaging portion 51, whereas a conductive member (not shown) to be connected to the conductive piece 41 is provided in the recess of the stepped engaging portion 50. An engaging recess into which the engaging projection 20 of the elastic piece 19 is engaged is formed in the bottom surface 22 of the battery case 21.

A mounting portion 58 for mounting a cartridge 57 containing a storage element in which game program data is stored is formed in the upper part of the rear surface 2b of the apparatus body 2.

In an embodiment of the present invention, the LCD game apparatus 1 has the liquid crystal display portion 4 in rectangular shape in the front surface 2a of the apparatus body 2, and is capable of being used for a game progressing with horizontal scrolling and a game progressing with vertical scrolling depending upon game program data of the cartridge 57. The liquid crystal display portion 4 in rectangular shape can be used in sideways or lengthwise in correspondence with game types.

A first operating button portion 60 and a second operating button portion 61 are provided in the upper and lower parts in the left of a shorter side of the liquid crystal display portion 4 on the front surface 2a of the apparatus body 2. In addition, a third operating button portion 62 is provided in the lower part of the right of another shorter side of the liquid crystal display portion 4. A volume controlling button 65 and a starting button 67 are provided in the lower part of the front surface 2a of the apparatus body 2. Furthermore, an ON/OFF switch 69 is provided in a side of the apparatus body 2.

The LCD game apparatus 1 arranged as above can be used in the following manner. When the cover member 35 of the battery case 21 is opened and a battery 23 is set in the battery compartment 25, the battery 23 is placed on the placing pieces 37, whereby the plus terminal 40 of the battery 23 contacts with the conductive piece 41 installed in the right side wall 30 of the battery compartment 25 and the minus terminal 43 of the battery 23 contacts with the conductive spring 45 installed in the left side wall 31 of the battery compartment 25. The cover member 35 is closed, allowing the engaging claw 47 of the cover member 35 to be engaged in the engaging recess 49 of the front wall 27, then the cover member 35 is fixed.

When the above-described battery compartment 21 is inserted from the insertion opening 5 of the apparatus body 2, while the bottom surface 22 of the battery case 21 slidingly contacts the bottom wall 6 of the housing recess 3, the stepped engaging portions 50, 51 in both sides engage with the engaging edges 11, 12 formed in the both sides of the housing recess 3. The battery case 21 is fixed inside the housing recess 3 when it is housed inside the housing recess 3 while contacting the rear wall 7 of the housing recess 3 and the engaging projection 20 formed on the elastic piece 19 of the bottom wall 6 engages with the engaging recess of the bottom surface 22.

At this time, since the conductive member 55 in the left side of the battery case 21 contacts with the contacting piece projecting from the opening formed in the left side wall 10 of the housing recess 3 and the conductive member in the left side of the battery case 21 contacts with the contacting piece 15 projecting from the opening 13 formed in the right side wall 9 of the housing recess 3, the battery 23 and the LSI inside the apparatus body 2 are electrically connected. The battery compartment 25 becomes substantially parallel with the lower edge 2c of the apparatus body 2.

The cartridge 57 is mounted in the mounting portion 58 with the battery case 21 housing the battery 23 mounted in the apparatus body 2 as described above, the ON/OFF switch 69 is turned ON and the starting button 67 is pressed. Then, the LCD game apparatus 1 may allow a game to start.

When the cartridge 57 of a game software in which the game progresses by horizontal scrolling is mounted in the mounting portion 58 of the apparatus body 2, the apparatus body 2 is held in sideways as shown in FIG. 4. In the alternative, when the cartridge 57 of a game software in which the game progresses by vertical scrolling is mounted in the mounting portion 58 of the apparatus body 2, the apparatus body 2 is held in lengthwise as shown in FIG. 5.

Figure 2:
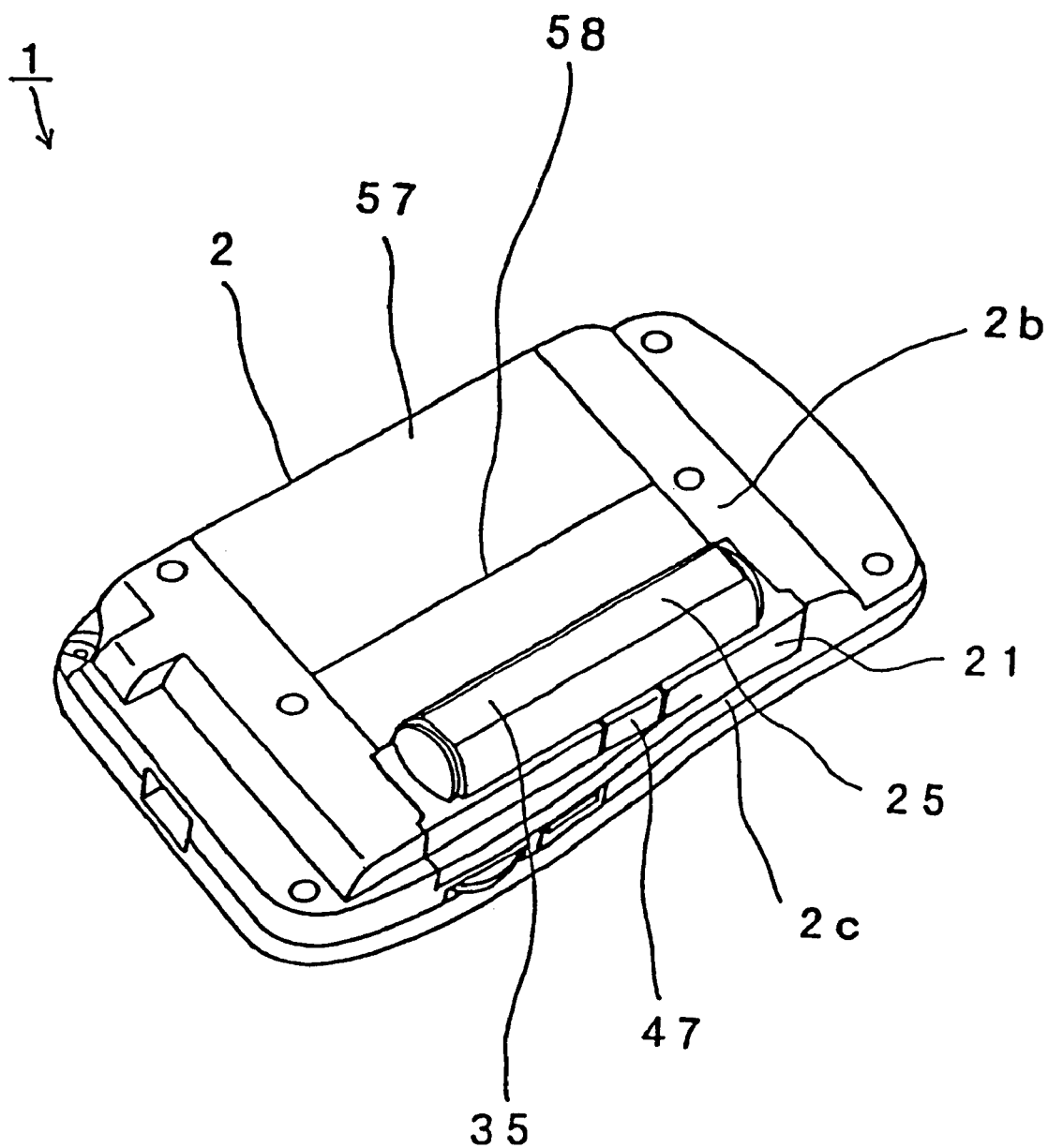
FIG. 2 is a perspective view, after assembly, of the LCD game apparatus of FIG. 1.
Figure 3:
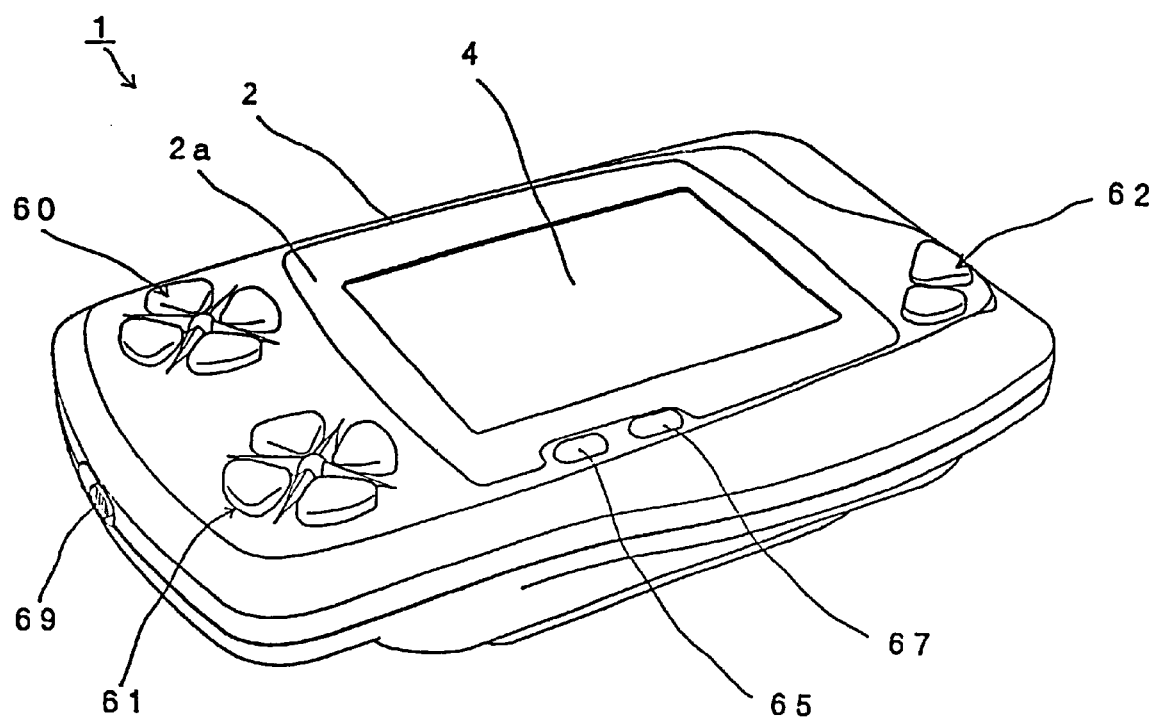
FIG. 3 is a front perspective view, after assembly, of the LCD game apparatus in accordance with an embodiment of the present invention.

When the apparatus body 2 is gripped sideways (as shown in FIG. 2), a player enjoys a game displayed on the liquid crystal display portion 4 by gripping the both sides of the apparatus body 2 with the palms, holding the rear surface 2b of the apparatus body 2 with the fingers, except thumbs, and pressing the second operating button portion 61 with the left thumb, and pressing the third operating button portion 62 with the right thumb. Since the battery compartment 25 provided on the rear surface 2b of the apparatus body 2 becomes a protrusion, the index fingers and other fingers can hook the protrusion to enable the player to obtain a more secure hold on the game apparatus.

When the apparatus body 2 is gripped lengthwise (as shown in FIG. 5), a player enjoys a game displayed on the liquid crystal display portion 4 by gripping the sides of the apparatus body 2 with the palms, holding the rear surface 2b of the apparatus body 2 with the fingers, except thumbs, and pressing the first operating button portion 60 with the left thumb, and pressing the second operating button portion 61 with the right thumb. As with the horizontal playing position, the battery compartment 25 provided on the rear surface 2b of the apparatus body 2 becomes a protrusion, and the index fingers and other fingers can hook the protrusion to ensure more secure handling during playing.

As described above, since the index fingers and other fingers can hook the protrusion when the apparatus body 2 is gripped, the position of holding the apparatus by hands becomes stable and the possibility of incorrectly pressing the operating buttons may be eliminated. Even if a player is so absorbed in the game playing as to unintentionally handle the apparatus body forcefully and swing it or when hands get slippery with perspiration, the LCD game apparatus 1 cannot be dropped.

Furthermore, the cover member 35 of the battery compartment 25 can be opened easily by releasing the engaging claw 47 from the engaging recess 49 of the front wall 27 even if the battery case 21 is installed in the apparatus body 2, and the battery 23 can be exchanged.

The battery case 21 can be fixed easily inside the housing recess 3 by the engaging projection 20 of the elastic piece 19 when it is inserted from the insertion opening 5 of the apparatus body 2 as described above, and can be removed easily from the housing recess 3 by releasing the engaging protrusion 20. In this way, the battery case 21 can be attached and detached easily with a single motion. Since the battery case 21 can be attached and detached, if various battery cases 21 for different kinds of batteries are prepared, the battery cases 21 can be exchanged depending upon the duration of playing games.

As described above, the LCD game apparatus according to a first aspect of the present invention enables a player to enjoy playing games displayed on the liquid crystal display portion by gripping the both sides of the apparatus body with palms, holding the rear surface of the apparatus body by hands with fingers except thumbs and pressing the operating buttons with thumbs. In addition, there is an effect that, since index fingers and other fingers can hook the protrusion provided on the rear surface of the apparatus body, the holding position of hands becomes stable and possibility of incorrectly pressing the operating buttons may be eliminated. Moreover, even if a player is so absorbed in the game playing as to unintentionally handle the apparatus body forcefully and swing it or when the player's hands get slippery with sweat, the LCD game apparatus cannot be dropped.

The LCD game apparatus according to a second aspect of the present invention has, in addition to the above effects, an effect that, since the protrusion forms the battery compartment, it can house a battery available for relatively low price such as an R 6-type or AA-type battery and the LCD game apparatus can be used inexpensively compared with a conventional LCD game apparatus using a button battery.

The LCD game apparatus according to a third aspect of the present invention has, in addition to the above effects, an effect that, since the protrusion is formed on the battery case to be installed attachably and detachably to the apparatus body, if various battery cases for different kinds of batteries are prepared, the battery cases can be exchanged depending upon the duration of playing games.

Thus, it is seen that an LCD game apparatus is provided. One skilled in the art will appreciate that the present invention can be practiced by other than the preferred embodiments which are presented for purposes of illustration and not of limitation, and the present invention will be limited only by the claims which follow.

What is claimed is:

1. An LCD game apparatus, wherein a liquid crystal display portion and operating buttons are provided on the front surface of an apparatus body and a protrusion is formed on the rear surface of the apparatus body, wherein the protrusion forms a battery compartment and the battery compartment is a part of a battery case which is attachably and detachably attached to the apparatus body, and wherein the battery compartment is at least partly disposed within the apparatus body when the battery case is attached.

2. The LCD game apparatus according to claim 1, wherein the protrusion extends substantially parallel to one side edge of the apparatus body.

3. An LCD game apparatus comprising:
   a game apparatus housing having a front side, a rear side and at least one side edge;
   a display portion;
   at least one operating member on the front side of the game apparatus housing; and
   a battery case removably attached on the rear side of the game apparatus housing, the battery case including a protrusion, the protrusion extending from the rear side of the game apparatus housing when the battery case is attached on the rear side,
   wherein the battery case includes a battery housing that is at least partly disposed within the game apparatus housing when the battery case is attached.

4. The game apparatus according to claim 3 wherein the protrusion is structured as a holding member and is positioned on the rear side of the game apparatus housing extending generally parallel to the side edge of the game apparatus housing.

5. An LCD game apparatus, wherein a liquid crystal display portion and operating buttons are provided on the front surface of an apparatus body and a protrusion is formed on the rear surface of the apparatus body, wherein the protrusion forms a battery compartment and the battery compartment is a part of a battery case which is attachably and detachably attached to the apparatus body, and wherein the protrusion is structured to give stability, to reduce a probability of pressing wrong operating buttons and to reduce a probability of dropping the LCD game apparatus when the LCD game apparatus is being held.

6. An LCD game apparatus comprising:
   a game apparatus housing having a front side, a rear side and at least one side edge;
   a display portion;
   at least one operating member on the front side of the game apparatus housing; and
   a battery case removably attached on the rear side of the game apparatus housing, the battery case including a protrusion, the protrusion extending from the rear side of the game apparatus housing when the battery case is attached on the rear side, the protrusion being structured to give stability, to reduce a probability of pressing wrong operating buttons and to reduce a probability of dropping the LCD game apparatus when the LCD game apparatus is being held.

7. An LCD game apparatus, comprising:
   a liquid crystal display portion provided on a front surface of an apparatus body;
   operating buttons provided on at least two sides of the liquid crystal display portion;
   a protrusion formed on a lower rear surface of the apparatus body extending substantially parallel with a bottom edge of the apparatus body; and a battery compartment formed in the protrusion.

8. An LCD game apparatus, comprising:

a liquid crystal display portion provided on a front surface of an apparatus body;

operating buttons provided on at least two sides of the liquid crystal display portion;

a protrusion formed on a lower rear surface of the apparatus body extending substantially parallel with a bottom edge of the apparatus body; and a battery compartment formed in the protrusion, wherein the protrusion forming the battery compartment is provided on a battery case, and wherein a bottom edge of the battery case forms a part of the bottom edge of the apparatus body.

9. The LCD game apparatus according to claim 8, wherein the battery case is detachably attached to the apparatus body.

10. The LCD game apparatus according to claim 8, wherein the liquid crystal display portion is disposed between some of the operating buttons.

* * * * *